United States Patent [19]
Etheridge et al.

[11] Patent Number: 5,937,634
[45] Date of Patent: Aug. 17, 1999

[54] EMISSION CONTROL FOR A GAS TURBINE ENGINE

[75] Inventors: Colin J. Etheridge, Chula Vista; Kenneth O. Smith, San Diego, both of Calif.

[73] Assignee: Solar Turbines Inc, San Diego, Calif.

[21] Appl. No.: 08/865,649

[22] Filed: May 30, 1997

[51] Int. Cl.⁶ .................................................. F02C 9/16
[52] U.S. Cl. ........................................ 60/39.27; 60/39.29
[58] Field of Search ............................. 60/39.23, 39.27, 60/39.29

[56] References Cited

U.S. PATENT DOCUMENTS

| | | | |
|---|---|---|---|
| 4,138,842 | 2/1979 | Zwick ..................................... | 60/39.29 |
| 4,949,538 | 8/1990 | Iasillo et al. .................................. | 60/39 |
| 5,024,055 | 6/1991 | Sato et al. ............................... | 60/39.27 |
| 5,309,709 | 5/1994 | Cederwall et al. ..................... | 60/39.23 |
| 5,321,947 | 6/1994 | Sood et al. .................................. | 60/737 |
| 5,327,718 | 7/1994 | Iwata et al. ............................. | 60/39.27 |
| 5,461,855 | 10/1995 | Inoue et al. ............................. | 60/39.06 |
| 5,584,171 | 12/1996 | Sato et al. ................................ | 60/39.03 |

*Primary Examiner*—Louis J. Casaregola
*Attorney, Agent, or Firm*—Larry G. Cain

[57] ABSTRACT

Present gas turbine engines fail to effectively and efficiently control the emission emitted therefrom. Many existing systems estimate the amount of constituents emitted within the exhaust gas verses measuring the actual quantity of constituent emitted within the exhaust gas. The present exhaust gas monitoring system has the ability to measure the actual quantity of an emission constituent, such as carbon monoxide (CO), sends a signal to a control box, interprets the signal, sends a second signal to an actuation device controlling a fluid flow to the combustion section resulting in the controlling of emissions emitted from the gas turbine engine within the exhaust gas.

18 Claims, 3 Drawing Sheets

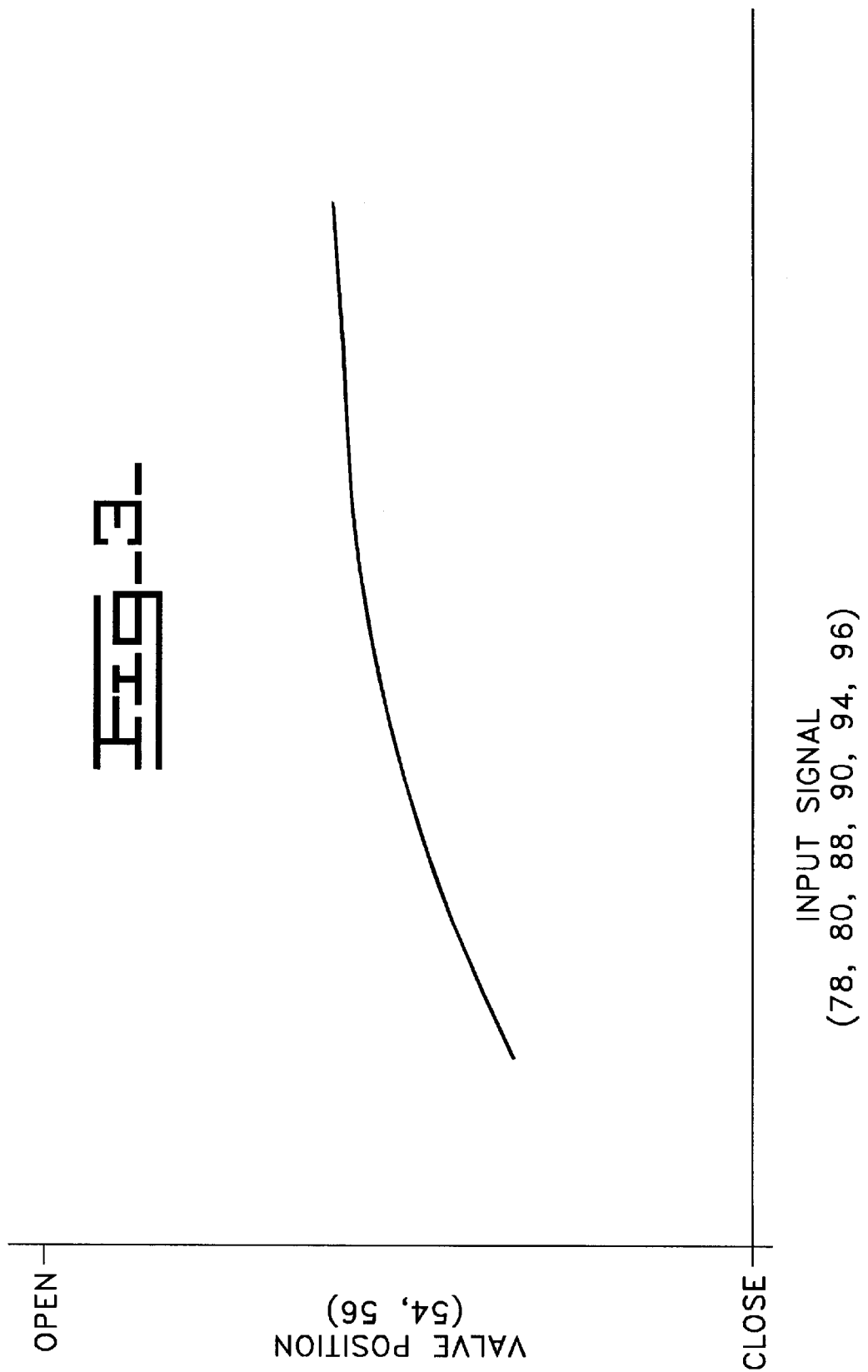

EMISSION CONTROL FOR A GAS TURBINE ENGINE

TECHNICAL FIELD

This invention relates generally to a gas turbine engine and more particularly a system for controlling emission from the gas turbine engine.

BACKGROUND ART

The use of fossil fuel in gas turbine engines results in the combustion products consisting of carbon dioxide, water vapor, oxides of nitrogen, carbon monoxide, unburned hydrocarbons, oxides of sulfur and particulates. Of these above products, carbon dioxide and water vapor are generally not considered objectionable, In most applications, governmental imposed regulations are further restricting the remainder of the constituents, mentioned above, emitted in the exhaust gases.

The majority of the products of combustion emitted in the exhaust can be controlled by design modifications, cleanup of exhaust gases and/or regulating the quality of fuel used. For example, particulates in the engine exhaust have been controlled either by design modifications to the combustors and fuel injectors or by removing them by traps and filters. Sulfur oxides are normally controlled by the selection of fuels that are low in total sulfur. This leaves nitrogen oxides, carbon monoxide and unburned hydrocarbons as the emissions of primary concern in the exhaust gases emitted from the gas turbine engine.

One of the approaches to reducing emissions utilizes the lean premix combustion concept. In this approach the fuel and air are uniformly premixed before they enter the combustion zone of a combustor and the fuel/air ratio is controlled so that there is a relative excess of air as compared to the stoichiometric fuel/air ratio. In the lean premix combustion concept it is possible to control emissions by controlling the fuel/air ratio within the combustor, the other variables being primarily dependent variables.

The principal mechanism for the formation of oxides of nitrogen involves the direct oxidation of atmospheric nitrogen and oxygen. The rate of formation of oxides of nitrogen by this mechanism depends mostly upon the flame temperature and, to some degree, upon the concentration of the reactants. Consequently, a small reduction in flame temperature can result in a large reduction in the nitrogen oxides.

If the flame temperature is reduced too far, significant levels of carbon monoxide are left in the exhaust gas because the oxidation rate of carbon monoxide to carbon dioxide slows down and eventually stops. The carbon monoxide is present because it is formed during the reaction of the hydrocarbon gases with the air.

Some examples of mechanical devices used to control flame temperature are variable geometry injectors or other types of systems to influence the ratio of fuel and air within the combustor. In controlling such devices, control systems must be formulated. For example, as shown in U.S. Pat. No. 5,309,709 issued on May 10, 1994 to Philip J. Cederwall et al., such a system is disclosed. In the disclosed control system, the air/fuel ratio is controlled. For example, the system includes a manifold in which the quantity of compressor air directed thereto is controlled. The air flow from the manifold is directed to a plurality of injectors and hence the air/fuel ratio within a combustor is controlled or regulated. A throttling mechanism moves between an open position and a closed position varying the flow rate of compressed air to the manifold and consequently, to the combustor. Excess air not used for cooling or combustion is dumped to the atmosphere.

The system defined above uses measured operating level, such as temperature, to correlate what is assumed to be the level of emission being emitted from the gas turbine engine. The actual measured emission is only accomplished by external systems which are usually performed at random specified intervals. The use of actual measured emission systems is complex, time consuming and has a slow response. Normally, actual emission measurement systems include taking a sample or samples, transporting the sample to an analyzer, having the sample analyzed, assessing the results of the analysis and changing parameters of the engine operation depending on the results of the analysis. Such actual emission measurement systems are expensive, result in a slow turn around time and are complex to operate.

The above systems used therewith are examples of attempts to control the emissions of carbon monoxide and oxides of nitrogen.

The present invention is directed to overcome one or more of the problems as set forth above.

DISCLOSURE OF THE INVENTION

In one aspect of the invention, an exhaust gas monitoring system for use with a gas turbine engine is disclosed. The gas turbine engine defines a housing having a compressor section operatively connected to a turbine section and a combustor section. Each section is positioned within the housing. The compressor section produces a fluid flow which is communicated to the combustor section. A combustible fuel communicates with the fluid flow and produces a high pressure fluid which drives the turbine section and forms the exhaust gas. The exhaust gas includes an emission constituent. The monitoring system is comprised of a sensor positioned in the exhaust gas which measures the quantity of emission constituents and produces a first signal. A control box is in communication with the sensor and interprets the first signal. An actuation device is connected to the combustor section and controls the fluid flow to the combustor section. A second signal is sent from the control box to the actuation device and moves the actuation device between an open position and a closed position.

In another aspect of the invention, an exhaust gas monitoring system for use with a gas turbine engine is disclosed. The gas turbine engine defines a housing having a compressor section operatively connected to a turbine section and a combustor section, each section being positioned within the housing. The compressor section produces a fluid flow which is in communication with the combustor section. A combustible fuel is in communication with the fluid flow and produces a high pressure fluid for driving the turbine section and forms the exhaust gas. The exhaust gas includes an emission constituent. The monitoring system is comprised of a first sensor operatively positioned relative to one of the turbine sections and the combustor section and produces a primary input signal. A second sensor is positioned in the exhaust gas which measures the quantity of emission constituents and produces a secondary input signal. A control box is in communication with the first sensor and the second sensor and respectively interprets the primary input signal and the secondary input signal. An actuation device is connected to the combustor section and controls the fluid flow to the combustor section. A first output signal is sent from the control box to the actuation device and moves the actuation device between an open position and a closed position. A second output signal is sent from the control box to the actuation device and, more precisely, moves the actuation device between the open position and the closed position.

BRIEF DESCRIPTION OF THE DRAWINGS

FIG. 3 is a graphic representation of the functional operation of the control system being embodied in the present invention.

BEST MODE FOR CARRYING OUT THE INVENTION

Figure 1:
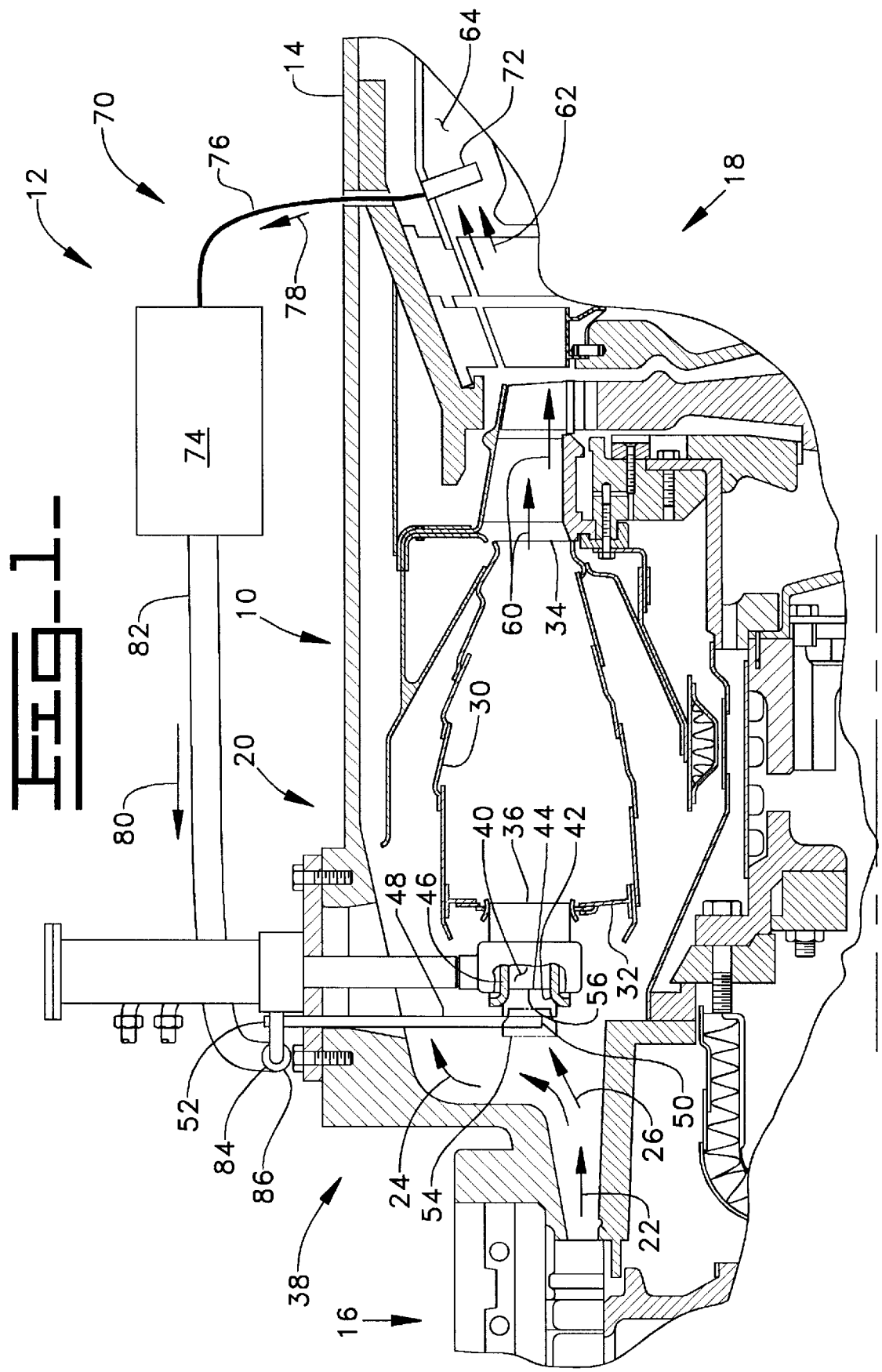
FIG. 1 is a side elevational view of a gas turbine engine embodying the present invention, a control system.
Figure 2:
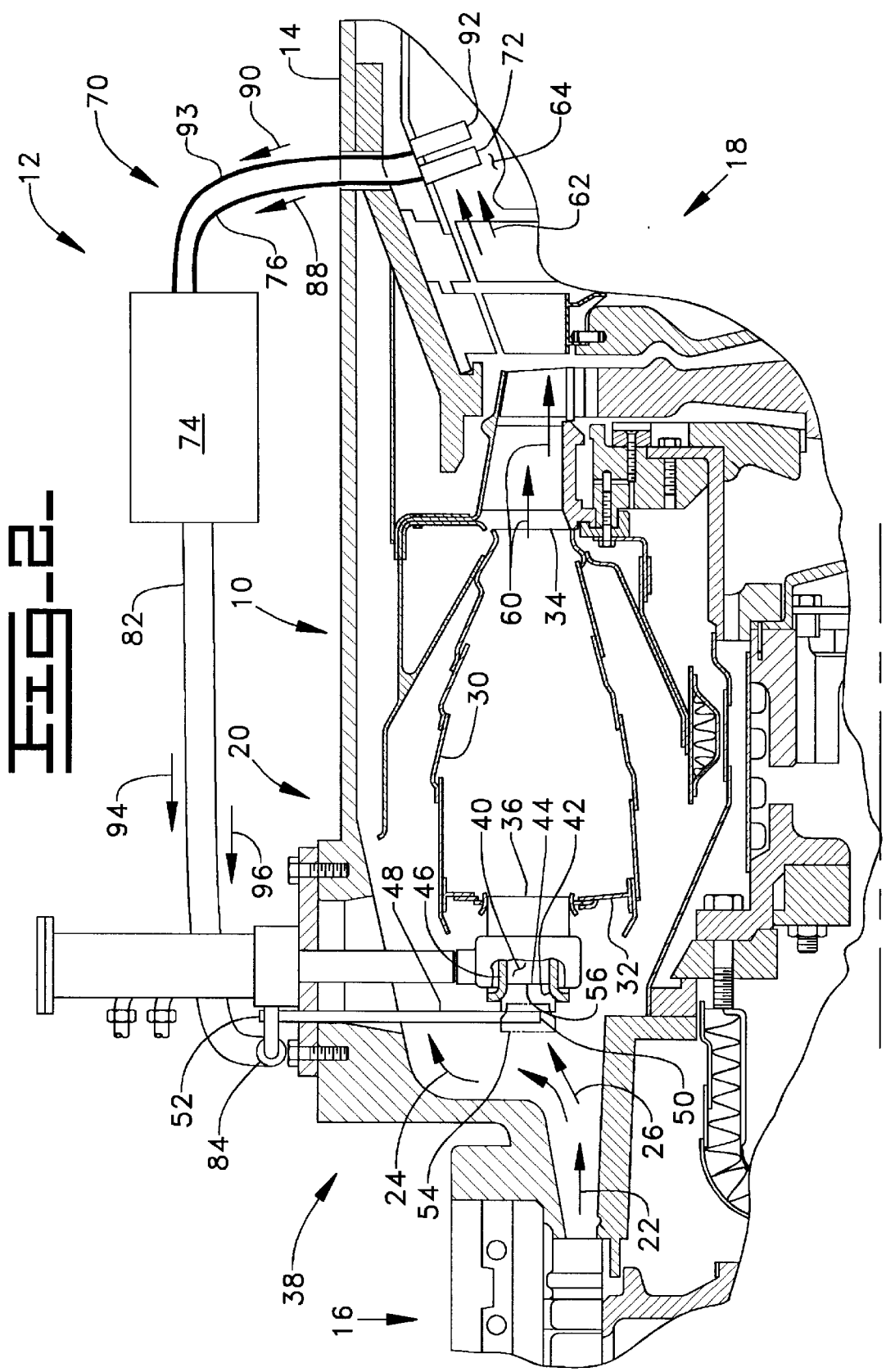
FIG. 2 is a side elevational view of a gas turbine engine defining an alternative embodiment of the present invention, an additional control system.

Referring to FIGS. 1 and 2, a gas turbine engine 10 is shown. The gas turbine engine 10 includes a system 12 for continuously controlling and reducing nitrogen oxide, carbon monoxide and unburned hydrocarbon emissions. The gas turbine engine 10 includes a housing 14 having a compressor section 16 operatively connected to a turbine section 18 and a combustor section 20 positioned therein. During operation of the gas turbine engine 10, a fluid flow, as shown by the arrows 22, is formed by the compressor section 16 and is communicated to the combustor section 20 in a conventional manner. The fluid flow 22 is separated into a first fluid flow path 24 being used to cool engine components such as the combustor section 20 and a second fluid flow path 26 being used to support combustion.

The combustor section 20 includes an annular combustor 30, but, as an alternative, could be of any conventional design such as a can combustor or a plurality of can combustors. The annular combustor 30 defines an inlet end 32 and an outlet end 34. A plurality of fuel injectors 36 are positioned in the inlet end 32 of the annular combustor 30 and supply a controlled amount of fuel, not shown, to the annular combustor 30. In this application, each of the plurality of fuel injectors 36 are of the variable geometry design and includes a device 38 which controls the amount of combustible fluid passing into the annular combustor 30. In this application, each of the plurality of fuel injectors 36 includes a primary fluid flow path 40 having a preestablished flow area. The primary flow path 40 defines a seat 42 and has a mechanical plunger, or a rotating valve 44 movably positioned therein. The mechanical plunger 44 has a seat 46 thereon generally corresponding to the seat 42 within the primary flow path 40. A control arm 48 is connected to the mechanical plunger 44 at a first end 50 and has a second end 52 extending through the housing 14. As the second end 52 is rotated, the seat 46 on the mechanical plunger 44 moves between an open position 54, shown in phantom, and a closed position 56. The mechanical plunger 44 is controllably movable to any position between the open position 54 and the closed position 56.

As the fluid from the second fluid flow path 26 and the fuel are mixed and combusted, a high pressure fluid, as indicated by the arrows 60, is formed. The high pressure fluid 60 passes through the outlet end 34 of the annular combustor 30, drives the turbine section 18 and forms an exhaust gas, as indicated by the arrows 62. The exhaust gas 62 is exhausted from the housing 14 through an exhaust duct 64 in a conventional manner, or as an alternative, the exhaust gas 62 could be directed to a recuperator.

The control system 12 includes a monitoring device or a plurality of monitoring devices 70 which, in this application, is a sensor 72 positioned in the exhaust gas 62 flowing from the turbine section 18. In this application, the sensor 72 is positioned in the exhaust duct 64 and the quantity of an emission constituent, which in this application is carbon monoxide (CO), within the exhaust gas 62 is monitored. As an alternative, other constituents such as nitrogen oxide (NOx) or oxygen (O2) could be monitored. The sensor 72 is connected to a control box or computer 74 by a plurality of wires 76. Within the computer 74, a first signal or input, as indicated by the arrow 78, from the sensor 72 is interpreted and a second signal, as indicated by the arrow 80, is sent through a second plurality of wires 82 to a power cylinder or actuation device 84. The device 84 is attached to the second attached to the second end 52 of the control arm 48 of each of the plurality of injectors 36. In this application, a plurality of actuators 86, such as solenoids, only one shown, are attached to respective ones of the plurality of injectors 36. As an alternative, the second end 52 of the individual control arms 48 could be interconnected with a single actuator. Movement of the single actuator would result in the individual control arm 48 of each of the plurality of injectors 36 moving the mechanical plunger 44 between the open position 54 and the closed position 56.

Experimentation has shown that existing systems for monitoring the quantity of emissions such as carbon monoxide (CO) and nitrogen oxide react slowly as compared to other measurement systems which are used with temperature, speed and horsepower. Therefore, as an alternative, best shown in FIG. 2, the first signal 78 from the sensor 72 could be used as a secondary input signal, as shown by arrow 88, from the sensor 72 to the computer 74 for trimming or fine tuning the emission control system 12. If the secondary input signal 88 is used for fine tuning a primary input signal, as shown by arrow 90, such as a representative of temperature could be used. The primary input signal 90 would be operatively sent to the computer 74 and interpreted. Such temperatures would be sensed by a sensor 92 operatively positioned relative to the power turbine inlet, gas producer turbine inlet or combustion zone. Other primary input signals 90 could include input from speed and horsepower monitors. Each or any combination of the above could be used.

For example, the sensor 92 would send a primary input signal 90 through a convention means, such as a plurality of wires 93, to the computer 74. The primary input signal 90 would be interpreted quickly and a first output signal, as shown by arrow 94, would be sent through the second plurality of wires 82 to the actuation device 84 and the plunger 44 is moved between the open position 54 and the closed position 56 varying the fluid flow 22 to the combustor section 20. At generally the same time, the sensor 72 positioned in the exhaust gas 62 sends the secondary input signal 88 through the first plurality of wires 76 to the computer 74. The computer 74 interprets the secondary input signal 88 and a second output signal 96 would be sent through the second plurality of wires 82 to the actuation device 84 and the plunger 44 is moved to a more precise position between the open position 54 and the closed position 56 fine tuning the fluid flow 22 to the combustor section 20. Thus, the monitoring system 12 responds quickly to sudden and abrupt gas turbine engine 10 changes and further fine tunes the emissions emitted therefrom during steady state operating conditions.

As shown in FIG. 3, the primary input signal 90 and/or secondary input signal 88 is charted against the position of the plunger 44 within the plurality of fuel injectors 36. For example, in this application, the greater the amount of carbon monoxide (CO), the higher the magnitude of the first signal 78 and/or secondary input signal 88. Additionally, as the interpretation of the signal 78,88 shows an increase of emissions, the actuation device 84 is moved closer to the most open position 54. As shown by the graph, a small change in the position of the plunger 44 will produce a larger change in the carbon monoxide (CO).

Other aspects, objects and advantages of this invention can be obtained from a study of the drawings, the disclosure and the appended claims.

INDUSTRIAL APPLICABILITY

In operation, as best shown in FIGS. 1 and 2, the gas turbine engine 10 is started and brought up to operating speed and temperature. As load is applied to the gas turbine engine 10, the gas turbine engine 10 tends to lag or slow in speed. To overcome the speed reduction, additional fuel is added and the fuel/air ratio is changed resulting in a change in the combustion characteristics. The temperature of combustion changes and the emissions emitted therefrom varies. As a result of the increase in temperature of the combustion gases or high pressure fluid 60, the turbine section 18 increases in speed and the resulting driven load is accelerated to driven speed. The exhaust gas 62 exiting the turbine section 18 is monitored. For example, the sensor 72 monitors the quantity of carbon monoxide (CO) and sends the signal 78, either primary input 90 or secondary input 88, through the plurality of wires 76 to the control box or computer 74. Within the computer 74, the signal 78 is interpreted, and a second signal 80 is sent through a second plurality of wires 82 to the device 84. The device 84 then actuates the control arm 48 moving the plunger 44 between the open position 54 and the closed position 56 to control the quantity of emissions being emitted.

More precisely in this application, the sensor 92 monitors temperature, and the primary input signal 90 is input to the computer 74 and interpreted. The first output signal 94 is sent through the second plurality of wires 82 to the actuation device 84. The actuation device 84 moves the plunger 44 appropriately between the open position 54 and closed position 56 quickly compensating for a change in the fuel and air mixture. Additionally, the sensor 72 is monitoring the emissions within the exhaust gas 62 and the secondary input signal 88 is input to the computer 74, interpreted, and an additional second output signal 96 is sent through the second plurality of wires 82 to the actuation device 84. The actuation device 84 moves the plunger 44 more precisely between the open position 54 and the closed position 56 fine tuning the air\fuel mixture controlling emissions to an acceptable predetermined level.

The present system 12 continuously monitors and controls emissions to a predetermined acceptable level. With the continuous monitoring of the combustion products within the exhaust gas 62, the mechanical components are actuated and controlled to fine tuned combustion products within the exhaust gas 62. The mechanical components control the fuel/air ratio. With the system 12 being able to continuously monitor the combustion products within the exhaust gas 62, the system 12 can functionally compensate for ambient variations, manufacturing variations and engine degradation associated with time.

Other aspects, objects, and advantages of this invention can be obtained from a study of the drawings, the disclosure, and the appended claims.

I claim:

1. An exhaust gas monitoring system for use with a gas turbine engine defining a housing having a compressor section operatively connected to a turbine section and a combustor section, each being positioned within said housing, said compressor section producing a fluid flow being in communication with the combustor section and having a combustible fuel being in communication with said fluid flow and producing a high pressure fluid driving said turbine section and forming said exhaust gas, said exhaust gas including an emission constituent; said monitoring system comprising:

a sensor being positioned in said exhaust gas, measuring the quantity of said emission constituent and producing a first signal;

a control box being in communication with said sensor and interpreting said first signal;

a fuel injector being positioned in said combustor section and providing said combustible fuel communicating with said fluid flow;

an actuation device being connected to said fuel injector and controlling at least a portion of said fluid flow through said fuel injector to said combustor section; and a second signal being sent from said control box to said actuation device and moving said actuation device between an open position and a closed position.

2. The exhaust gas monitoring system of claim 1 wherein said emission constituent being measured is carbon monoxide (CO).

3. The exhaust gas monitoring system of claim 1 wherein said emission constituent being measured is nitrogen oxide (NOx).

4. The exhaust gas monitoring system of claim 1 wherein said fluid flowing through said fuel injector is controlled by a variable geometry design.

5. The exhaust gas monitoring system of claim 4 wherein said variable geometry design includes a mechanical plunger.

6. The exhaust gas monitoring system of claim 1 wherein said gas turbine engine further includes a plurality of fuel injectors and said fluid flow being controlled passes through said plurality of fuel injectors.

7. The exhaust gas monitoring system of claim 6 wherein said actuation device includes a plurality of actuation devices each being connected to a respective one of said plurality of fuel injectors.

8. The exhaust gas monitoring system of claim 7 wherein each of said plurality of actuation devices is a solenoid.

9. An exhaust gas monitoring system for use with a gas turbine engine defining a housing having a compressor section operatively connected to a turbine section and a combustor section, each being positioned within said housing, said compressor section producing a fluid flow being in communication with said combustor section and having a combustible fuel being in communication with said fluid flow and producing a high pressure fluid driving said turbine section and forming said exhaust gas, said exhaust gas including an emission constituent; said monitoring system comprising:

a first sensor being operatively positioned relative to one of said turbine section and said combustor section and producing a primary input signal;

a second sensor being positioned in said exhaust gas, measuring the quantity of said emission constituent and producing a secondary input signal;

a control box being in communication with said first sensor and said second sensor and respectively interpreting said primary input signal and said secondary input signal;

an actuation device being connected to said combustor section and controlling said fluid flow to said combustor section;

a first output signal being sent from said control box to said actuation device and moving said actuation device between an open position and a closed position; and a second output signal being sent from said control box to said actuation device and more precisely moving said actuation device between the open position and the closed position.

10. The exhaust gas monitoring system of claim 9 wherein said first sensor monitors a temperature.

11. The exhaust gas monitoring system of claim 9 wherein said emission constituent being measured is carbon monoxide (CO).

12. The exhaust gas monitoring system of claim 9 wherein said emission constituent being measured is nitrogen oxide (NOx).

13. The exhaust gas monitoring system of claim 9 wherein said gas turbine engine further includes a fuel injector and said fluid flow being controlled passes through said fuel injector.

14. The exhaust gas monitoring system of claim 13 wherein said fluid flowing through said fuel injector is controlled by a variable geometry design.

15. The exhaust gas monitoring system of claim 14 wherein said variable geometry design includes a mechanical plunger.

16. The exhaust gas monitoring system of claim 9 wherein said gas turbine engine further includes a plurality of fuel injectors and said fluid flow being controlled passes through said plurality of fuel injectors.

17. The exhaust gas monitoring system of claim 16 wherein said actuation device includes a plurality of actuation devices each being connected to a respective one of said plurality of fuel injectors.

18. The exhaust gas monitoring system of claim 17 wherein each of said plurality of actuation devices is a solenoid.

* * * * *